United States Patent [19]
Winston et al.

[11] Patent Number: 5,846,354
[45] Date of Patent: Dec. 8, 1998

[54] TIRE PRESSURE MAINTENANCE SYSTEM

[76] Inventors: Patrick H. Winston, 88 Monument St., Concord, Mass. 01742; Thomas F. Knight, Jr., 58 Douglas Rd., Belmont, Mass. 02187

[21] Appl. No.: 561,367

[22] Filed: Nov. 21, 1995

Related U.S. Application Data

[62] Division of Ser. No. 191,315, Feb. 1, 1994, Pat. No. 5,472,032.

[51] Int. Cl.$^6$ .................................................. B60C 23/12
[52] U.S. Cl. ............................... 152/418; 92/92; 417/395
[58] Field of Search .................................... 152/415, 418; 417/395, 231, 233; 92/90, 91, 92; 36/29, 35 B

[56] References Cited

U.S. PATENT DOCUMENTS

| | | | |
|---|---|---|---|
| 4,349,064 | 9/1982 | Booth | 152/418 |
| 5,171,132 | 12/1992 | Miyazaki et al. | 417/413 |
| 5,325,902 | 7/1994 | Loewe et al. | 152/419 |

*Primary Examiner*—Michael W. Ball
*Assistant Examiner*—Francis J. Lorin
*Attorney, Agent, or Firm*—Nutter, McClennen & Fish, LLP

[57] ABSTRACT

A gas transfer system is provided for establishing or maintaining a predetermined gas pressure within a plenum, such as a tire. In an exemplary embodiment, the gas transfer system includes a power source, a pressure sensor, a control unit, and a gas transfer mechanism. Preferably, a gas transfer mechanism includes a micromechanical device, comprising one or more pumping units that transfer gas from one pressure zone to another. In one embodiment, pumping is accomplished, in part, by heating the gas within a sealable chamber of a pumping unit to cause the pressure of the gas to increase. In another embodiment, the change in pressure of the gas caused by compression of a tire provides a pumping force. Valves are provided for regulating movement of the gas through the gas transfer mechanism and can include electromechanical valves responsive to signals from the control unit, or passively biased valves responsive to applied gas pressure.

6 Claims, 10 Drawing Sheets

TIRE PRESSURE MAINTENANCE SYSTEM

This application is a division of U.S. application Ser. No. 08/191,315, filed Feb. 1, 1994 now U.S. Pat. No. 5,472,032.

FIELD OF THE INVENTION

The present invention relates to a gas transfer system, and more particularly to apparatus for establishing and/or maintaining a predetermined gas pressure within a tire or other plenum.

BACKGROUND OF THE INVENTION

Proper inflation of automotive or other tires currently relies on near perfect sealing of tires to tire rims and excellent performance of tire valves, together with periodic monitoring of tire pressure and re-fill as necessary. Improper tire inflation causes reduced gasoline mileage, abnormal wear patterns, dramatically reduced tire life, and poor safety performance. However, most users persistently demonstrate an unwillingness to monitor and maintain proper tire inflation, typically with the assistance with a filling station pressurized air supply or pump.

Alternative techniques to the filling station air pump for monitoring and adjusting tire pressure are known. For example, U.S. Pat. No. 4,924,926 to Schultz et al. discloses a central tire inflation system having a central pressure distribution and monitoring system which allows tire pressure to be monitored and changed using dashboard controls. Inadequacies of this system include difficulty in sealing joints between the central pressure distribution and the rotating tire rim and tire. Additionally, the Schultz system requires significant investment in vehicle mounted equipment, and it is not easily used with conventional tire mountings or rims.

Another inflation system is disclosed by U.S. Pat. No. 5,119,856 to Zarotti, wherein tire pressure is adjusted with an inflatable bladder internal to the tire, the bladder containing a two-phase material responsive to a thermoelectric heater/cooler. A pressure sensor monitors tire inflation pressure while power is delivered to the tire through an electromagnetic coupling mounted partially on the stationary portion of a car and partially on each tire. Control information is delivered through a modulated carrier transmitted through the electromagnetic coupling, and is locally compared to the monitored tire pressure. Problems with the Zarotti device include the requirement to maintain tire inflation at an adequate level prior to the servo startup, relatively slow adjustment to operating pressure level following startup, and the requirement for vehicle modification to accommodate the system.

U.S. Pat. No. 4,922,984 to Dosjoub et al., discloses entirely mechanical means for automatically maintaining proper tire inflation. However, the reliance on mechanical techniques yields high cost and low reliability.

U.S. Pat. No. 4,349,064 to Booth discloses means for pumping air into a tire by using changes in centrifugal force pursuant to changes in vehicle speed. As the centrifugal force increases, a weight compresses a spring, and this motion is converted into pumping action. Again, the reliance on mechanical techniques yields high cost and low reliability.

U.S. Pat. No. 4,651,792 to Taylor pumps air by using changes in the centrifugal force as seen by a tread-mounted device during each rotation of the tire. As the portion of the tire with the tread-mounted device comes in contact with the ground, that portion undergoes deformation which changes the effective radius of the tire, thus changing the centrifugal force. As the centrifugal force increases, a weight compresses a spring, and this motion is converted into pumping action. Again, the reliance on mechanical techniques yields high cost and low reliability.

It would therefore be desirable to pump a gas between a plenum, such as a tire, and a point exterior to the plenum, without the power, size, weight, and cost of pump assemblies presently available.

SUMMARY OF THE INVENTION

In surmounting the foregoing disadvantages, the present invention provides apparatus for establishing and/or maintaining a predetermined gas pressure within a tire or other plenum.

One embodiment of the invention is a gas transfer system for maintaining the pressure within a plenum that includes a power source, a pressure sensor, a control unit, and a gas transfer mechanism. The gas transfer mechanism can include a micromechanical device, comprising one or more pumping units that transfer gas from one pressure zone to another.

Another embodiment of the invention is a self-adjusting tire inflation system including a vehicle independent power source, such a photovoltaic cell, a thermocouple, or a deformable PVDF film. The gas transfer mechanism can include a micromechanical device, comprising one or more pumping units that pump external air into a vehicle tire, by raising the pressure of the air incrementally. Either electromagnetic valves responsive to signals from a control unit, or passively biased valves responsive to gas pressure, control the flow of gas through the gas transfer mechanism.

One embodiment of the micromechanical device includes a heatable and sealable chamber, wherein gas is introduced to the chamber, the chamber is sealed and then heated to cause the pressure of the gas to increase, whereupon the pressurized gas is released directly into the plenum or another chamber leading to the plenum for further elevating the gas pressure.

In another embodiment of the micromechanical device, an air transfer chamber and a pumping chamber are separated by a flexible membrane, wherein compression of the plenum provides a pumping force. Valves are provided in the micromechanical pumps to regulate movement of the gas through the pumps.

The valves of the various embodiments of the micromechanical devices can include a deformable element that is urged against or away from a sealable surface by electrical attraction or repulsion in response to a signal from a control unit. In other embodiments, the valves are biased against a sealing surface and are responsive to gas pressure. Additionally, the system components can either be discrete components that may be spatially dispersed, or one or more components may comprise an integral device.

Still other aspects of the invention include a method of pumping a gas, and devices and methods for generating power for a micromechanical pump.

BRIEF DESCRIPTION OF THE DRAWINGS

A more complete understanding of the present invention and the attendant advantages and features thereof will be more readily understood by reference to the following detailed description when considered in conjunction with the accompanying drawings wherein.

DETAILED DESCRIPTION

Figure 1:
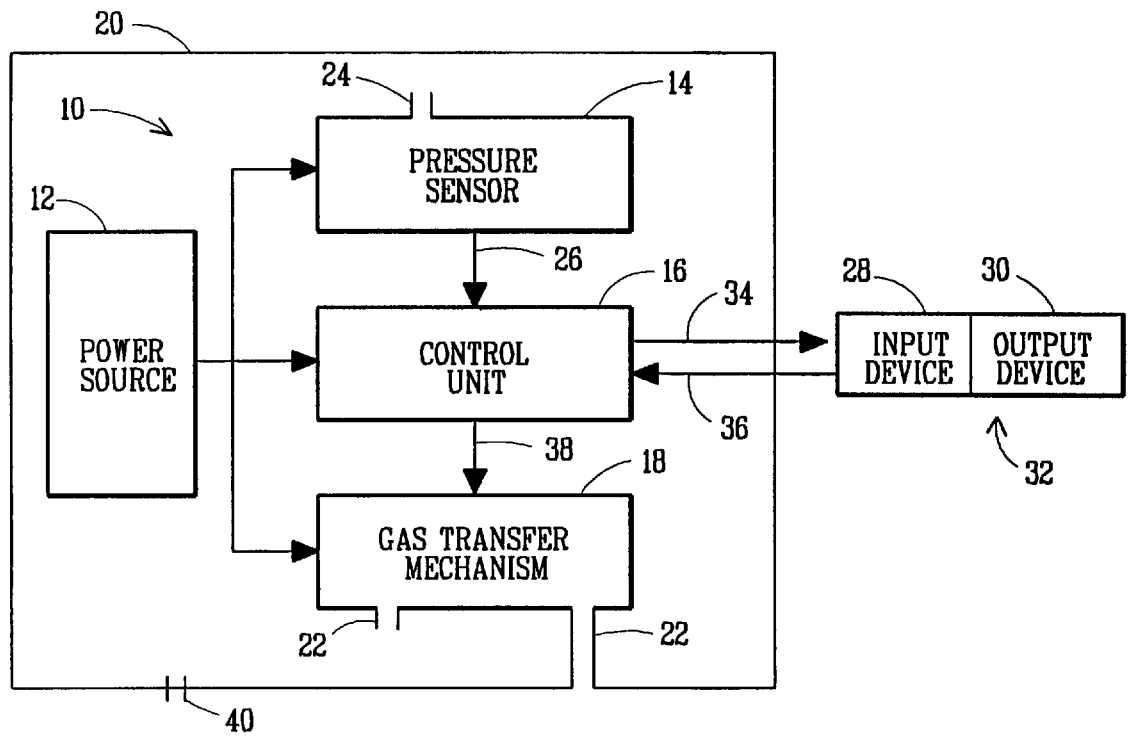
FIG. 1 is a block diagram of a gas transfer system of the invention.

FIG. 1 is a block diagram for a gas transfer system 10 having four major components, including a power source 12, a pressure sensor 14, a control unit 16, and gas transfer mechanism 18. In the description which follows, an embodiment of the system is described that is associated with a plenum 20, such as a vehicle tire or one or more bladders within a shoe.

Generally, the power source 12 provides power to the pressure sensor 14, the control unit 16, and the gas transfer mechanism 18. The gas transfer system 10 includes one or more gas transfer apertures 22 or passages adapted to conduct a gas between the apertured plenum 20 isolating a first environment from a second environment.

The pressure sensor 14 senses the pressure of a gas within the plenum 20 using techniques known to those skilled in the art. In one embodiment, the pressure sensor 14 is a microelectromechanical (MEMS) structure, similar to commercially available semiconductor pressure sensors, and includes an air inlet 24 into the sensor 14. Although the system components are illustrated as separate structures, they can be integrated as a single structure.

The pressure sensor 14 provides a signal 26 representing a current pressure value or a pressure change to the control unit 16, which can include a simple microprocessor implemented in a low power static technology, such as CMOS. In one embodiment of the system 10, the control unit 16 stores a digitally encoded target pressure value, which can be loaded at the time of manufacture or as required by a system user though an input device 28 located proximate the system 10, such as on the tire or valve stem, or from a remote input device in communication with the control unit 16, such as in a vehicle cab accessible from the driver's seat. Additionally, an output device such as display a 30 can be provided to monitor system status and pressure values. FIG. 1 illustrates an input/display unit 32 in communication with the system 10 via signal paths 34, 36.

Figure 1A:
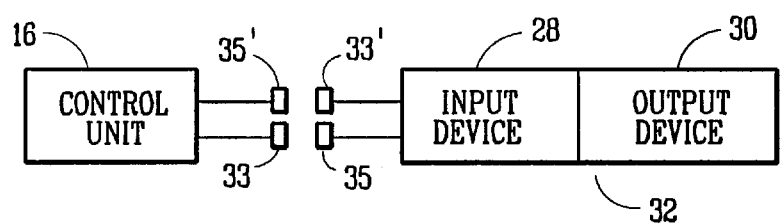
FIG. 1A is a block diagram for a non-contact, signal transfer between the control unit and the input/output devices shown in FIG. 1.

When the plenum 20 is a rotating vehicle tire, several challenges are presented with respect to signal passage between a remote input/display unit 32 and the control unit 16. FIG. 1A illustrates that this challenge can be overcome by providing "non-contact" signal transmission between the control unit 16 and the input/display unit 32. In this embodiment, an emitter 33 in communication with the control unit 16 transmits a signal to a receiver 35 in communication with the input/display unit 32 from the control unit 16. A similar but opposite paring of a receiver 33' and an emitter 35' transmits a signal from the input/display unit 32 to the control unit 16.

The emitter/receiver pairs can be adapted to function with forms of electromagnetic radiation, as is known in the art, such as through a pair of electromagnets or capacitor plates, one on the vehicle and one on the wheel. Other forms of communication between emitter/receiver pairs include radio communication or modulated light communication, mediated by a light-emitting-diode and photocell pair. Alternatively, acoustic communication, such as ultrasonic, can be provided by a speaker-microphone combination.

In another embodiment of the system 10 directed to vehicle tires, a target tire pressure is determined by a vehicle computer that modifies the target pressure as a function of the current weight of the vehicle, the current weather, the habits of the current driver, or other conditions, such as geographic location or road conditions at a particular geographic location. The condition information can be communicated to the vehicle computer via cellular telephone, global positioning satellites, roadside visual displays, or other means.

Additionally, the control unit 16 can be configured so that a loss of power from the power source 12 does not have an adverse impact on pressure control. In one embodiment of the system 10, failure of the power source 12 or power transmission to one or more of the other system components causes the gas transfer mechanism 18 to stop functioning, thus preventing gas from being introduced or exhausted from the plenum 20.

The gas transfer mechanism 18 can change the amount of gas in a plenum 20, not by changing the effective volume of the gas, but by increasing the pressure in the plenum 20 in response to a control signal 38. Thus, pressure adjustment involves adding gas or removing gas. Typically, removing gas is easier than adding gas, since a pressurized plenum 20, such as a tire, is at a higher pressure than atmospheric pressure, and simply opening a valve 40 releases pressure. Adding gas to the plenum 20 is more challenging, especially with a very small, light-weight, low-power device.

Figure 2:
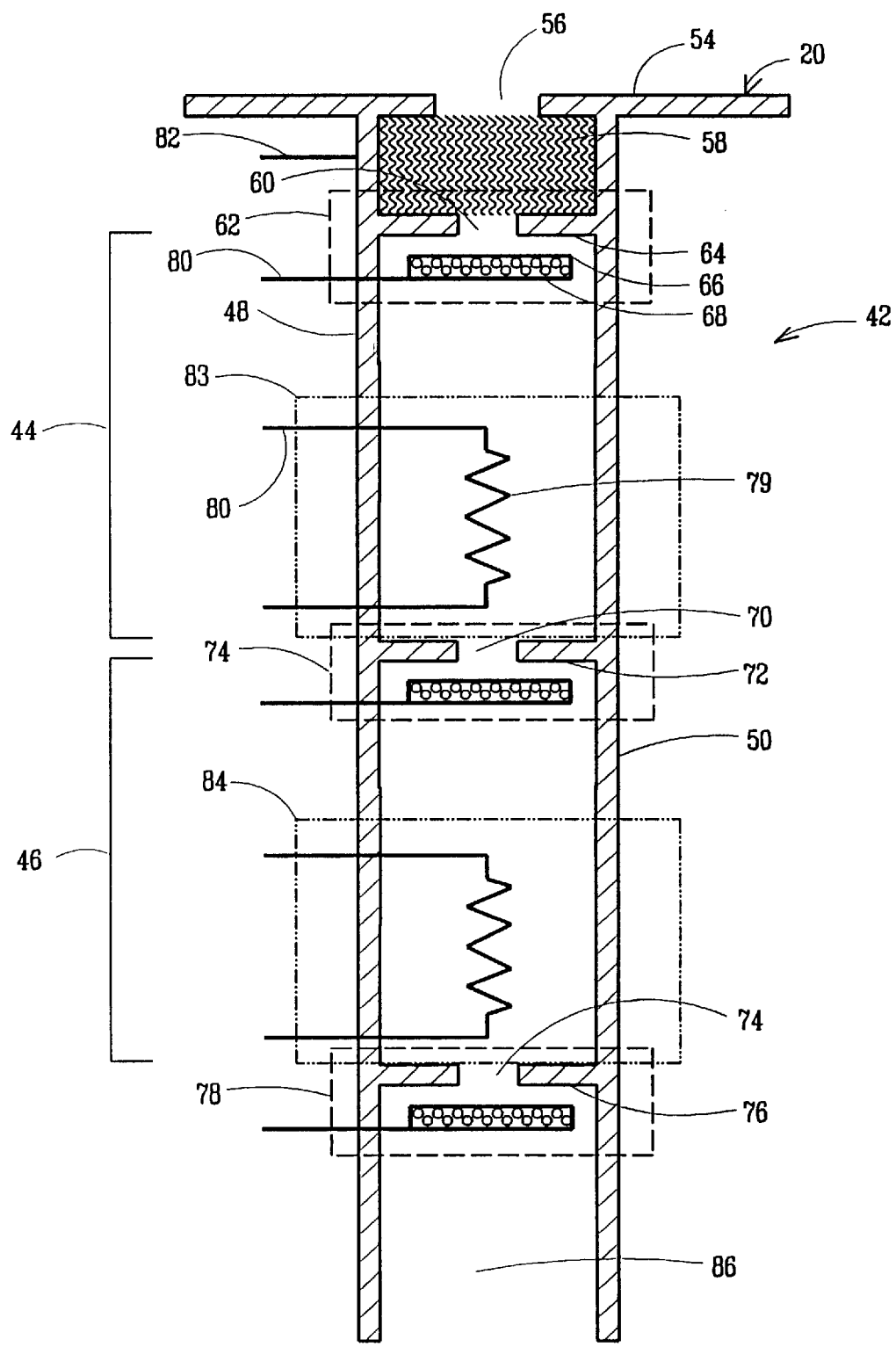
FIG. 2 is a schematic diagram of an implementation of a gas transfer device of the gas transfer system of FIG. 1.

FIG. 2 illustrates a micromechanical pump 42 that is an exemplary embodiment of the gas transfer mechanism 18 of the system 10 that meets the aforementioned challenge. The exemplary micromechanical pump 42 is shown having a first and a second pumping unit, 44 and 46, respectively. However, a single pumping unit is adequate for certain applications, depending on the pressure differential which must be maintained or established, and the power available. More pumping units can be incorporated into the micromechanical pump 42 as required. The term "micromechanical" as used herein includes devices that are strictly mechanical, electromechanical, pneumatic, or a combination thereof. With respect to device size, the term "micromechanical" encompasses nanoscale and lithographically fabricated implementations, as well as larger devices, such as systems the size of a typical wrist watch body or larger.

Each pumping unit 44 and 46 includes a chamber 48 and 50, respectively, apertured to permit a gas to flow though the pumping unit 42. Generally, for a micromechanical pump 42 having two pumping units, air at atmospheric pressure enters the first chamber 48 and is pumped into the second chamber 50, from which it is pumped out of the micromechanical pump into the plenum 20, such as a tire, which retains a volume of air at greater than atmospheric pressure.

In the illustrated embodiment of FIG. 2, the micromechanical pump 42 is shown in a sealed relationship with a tire wall 54 which defines the plenum 20, and the tire wall 54 having an opening 56 therethrough to permit passage of air to and from the micromechanical pump 42. An air filter 58 is provided at the face of a first aperture 60 or air inlet. Owing to the very small scale of the micromechanical pump 42 and the components thereof, the filter 58 is especially important for applications wherein the gas presented to the micromechanical pump 42 is contaminated with particulate matter.

The first aperture 60 is provided with a first valve 62 movable between a first or open position and a second or closed position which seals the aperture 60. In the exemplary embodiment, the aperture 60 is defined by a first valve seat 64, and the first valve 62 includes a deformable insulator 66 and a deformable conductor 68 having a surface of sufficient size and impermeability to engage the valve seat 64 in a sealing relationship and thereby block the aperture 60. A second aperture 70 in the first chamber 48 is defined by a second valve seat 72 having associated therewith a second valve 74 like the first valve 62.

The second pumping unit shares the second valve assembly 74 with the first pumping unit 44 and it defines a first aperture 70 in the second chamber 50. A second aperture 74 for the second chamber 50 is defined by a third valve seat 76 having associated therewith a third valve 78 like the first and second valves, 62 and 74, respectively. The first and second chambers, 48 and 50, are adapted to be heated and can include an integral heat source. In the illustrated embodiment, a resistive element 79 is provided within each chamber.

Power to heat the resistive elements 79 is provided via wires 80 connecting the resistive elements to the power source 12. The power source 12 further provides power to each of the valves 62, 74, and 78, wherein a charge of a first potential is provided to the deformable conductor 68 via a first wire 80, and a charge of a second potential is provided to the valve seat 64 via a second wire 82.

The micromechanical pump 42 of FIG. 2 operates over one or more pumping cycles as follows. Air enters the opening 56 in the plenum wall 54 and is cleaned by the air filter 58 as it passes through the first aperture 60 and into the first chamber 48. In response to a signal from the control unit 38, the power source 12 energizes the deformable conductor 68 and the valve seat 64. The difference in potential between the deformable conductor 68 and the first valve seat 64 creates an electric field which causes the deformable conductor 68 to be attracted to the first valve seat 64, thus closing the first valve 62.

The control unit 16 also commands current to be passed through the resistive element 79 to be energized, thus heating it and a volume of gas 83 within the first chamber 48. As the gas 83 is heated, it expands and a portion thereof is forced to move through the second valve 74 which is de-energized, or forced open despite being energized, into the second chamber 50. At a predetermined moment, based upon the time it takes the resistive element 79 to heat the gas 83 to a predetermined temperature, the control unit 16 interrupts the current flow to the resistive element 79, commands the second valve 74 closed and the first valve 62 open. At this moment, the gas pressure in the first chamber 48 is below that of the gas pressure exterior to the plenum 20, because the heating cycle has driven much of the gas 83 into the second chamber 50. When the remaining gas in the first chamber 48 cools, its pressure drops to and below the pressure of gas exterior to the plenum 20, allowing more gas to flow in through the first valve 62, wherein the pumping cycle may be repeated.

The second pumping unit 46 operates in the same manner as the first pumping unit 44 to move the pressurized gas 84, transferred from the first pumping unit 44, into the second chamber 50 at a still higher pressure toward the interior 86 of the plenum 20. Depending on the selected pressure elevation, two or more cycles of the first or lower pressure pumping unit 44 may be required for each cycle of the second or higher pressure pumping unit 46. As stated hereinabove, the heating of a chamber may be provided by other devices known to those skilled in the art.

Figure 3:
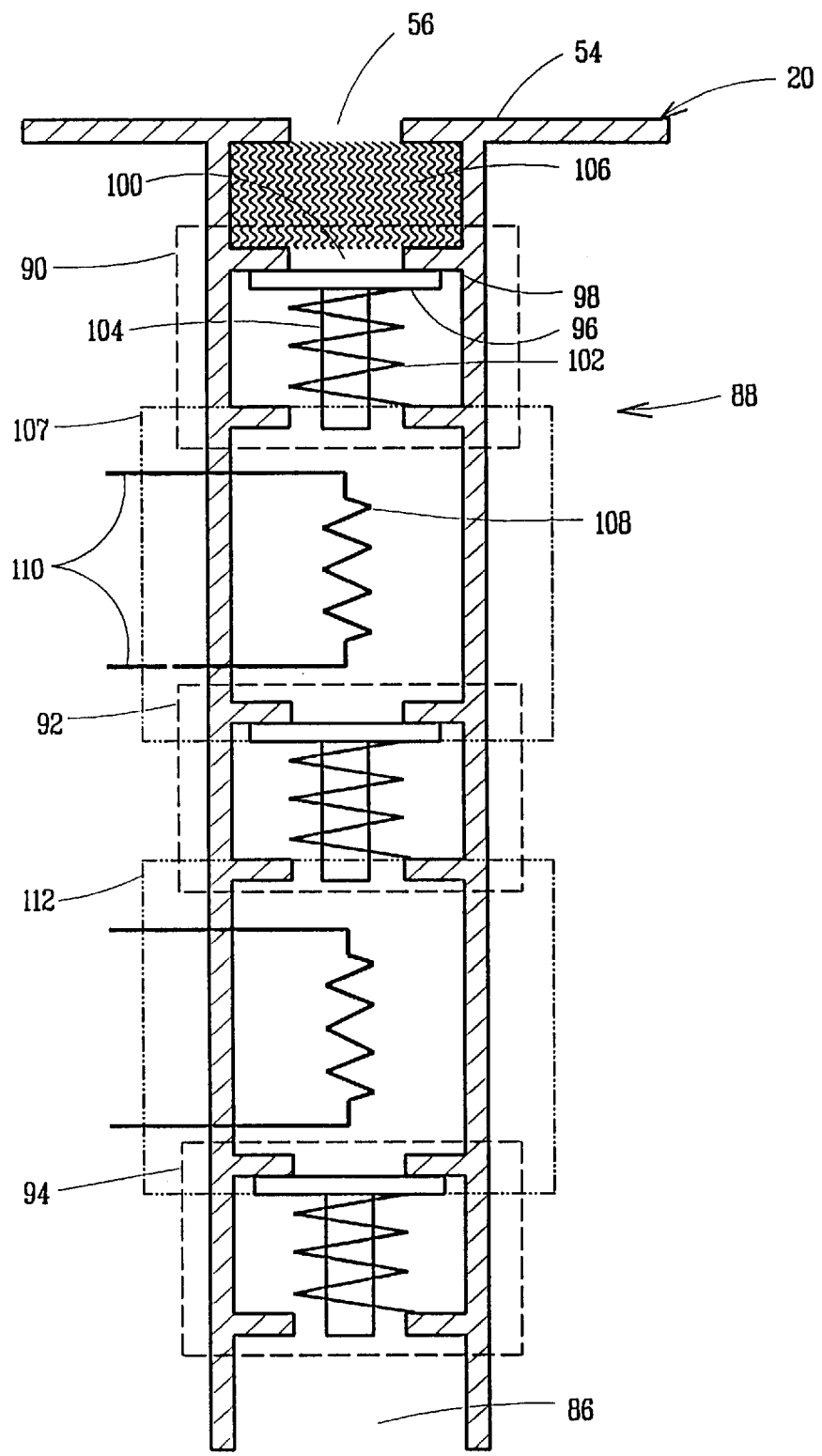
FIG. 3 is a schematic diagram of an alternative implementation of the gas transfer device illustrated in FIG. 2.

FIG. 3 illustrates another embodiment of the gas transfer mechanism 18, including a micromechanical pump 88 having an alternative implementation of valves. Whereas, the valves 62, 74, and 78, described with respect to FIG. 2 are active, requiring input from the control unit 16 and power from the power source 12, the valves of FIG. 3 are passive, requiring neither power or command inputs. Each valve 90, 92, 94 includes a sealing surface 96 biased against a valve seat 98 to block the aperture 100 defined by the valve seat 98. In the exemplary embodiment of FIG. 3, each of the valves is shown in its biased or closed state. Each valve is piston shaped, having a helical spring 102 disposed around a shaft 104, the spring 102 being compressible between a rear portion of the sealing surface 98 and a spring support, such as another valve seat. Other biasing means known in the art are also suitable. An air filter 106 is provided between the opening 56 in the plenum wall 54 and the aperture 100 leading to a first pumping unit 107, provided with a resistive element 108 adapted for electrical connection with a power source 12 via wires 110. A second pumping unit 112 is provided, as required, and is similar in structure to the first pumping unit 107.

The micromechanical pump 88 of FIG. 3 operates in the following manner. The control unit 16 commands current to pass through the resistive element 108 of the first pumping unit 107, thus heating the resistive element and the gas within the chamber 106. As the gas is heated, its pressure rises until it is sufficient to overcome the biasing force of the spring 102 of the second valve 92, thus forcing the second valve 92 to open and forcing a portion of the gas through the second valve 92. At a predetermined moment, the control unit 16 interrupts the current flow to the resistive element 108. At this instant, the pressure in first chamber 106 drops below that of the outside gas, allowing higher pressure gas external to the plenum 20 to overcome the biasing force of the spring 102 in the first valve 90.

The second pumping unit 112 operates in the same manner as the first to move the first volume of gas at still higher pressure toward the interior 86 of the plenum 20. Depending on the selected pressure elevation, two or more cycles of the first or lower pressure pumping unit 107 may be required for each cycle of the second or higher pressure pumping unit 112. As with the embodiment of FIG. 2, the second valve 92 is shared by both of the pumping units.

FIGS. 4–7 illustrate schematically another embodiment of the micromechanical pump 114, adapted to the special conditions of a flexible plenum 20 such as a vehicle tire or shoe insole. This embodiment uses temporary overpressure caused by compression of the plenum 20. In the case of a tire, the compression occurs as the tire rolls over bumps, or when the vehicle accelerates or decelerates.

The micromechanical pump 114 includes a pumping chamber 116; an air transfer chamber 118; a first valve 120 between the air transfer chamber 118 and the exterior of the plenum 20; a second valve 122 between the air transfer chamber 118 and the gas within the plenum; a third valve 124 between the pumping chamber 116 and the gas within the plenum; and a flexible membrane 126 separating the air pumping chamber 116 from the air transfer chamber 118.

Figure 4:
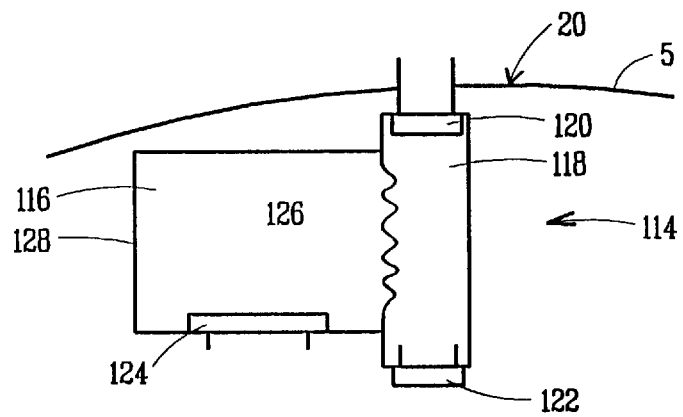
FIGS. 4–7 are a series of schematic illustrations depicting stages of operation of another embodiment of the gas transfer system of FIG. 1.

FIG. 4 illustrates the micromechanical pump 114 in a static state, wherein the pressure within the plenum 20 is constant. Thus, the pressure within the plenum 20 is equivalent to the pressure within the pumping chamber 116 and the air transfer chamber 118. Because this pressure is higher than the pressure exterior to the plenum, the first valve 120 remains closed, preventing the escape of air from the plenum 20.

Figure 5:
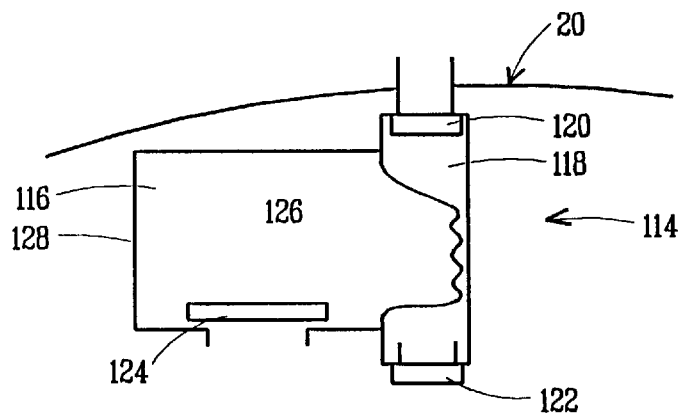

Referring to FIG. 5, the plenum 20 is shown during an overpressure condition, causing the third valve 124 to open, and allowing higher pressure air to flow into the pumping chamber 116. The higher pressure air in the pumping chamber 116 forces the flexible membrane 126 to protrude into the air transfer chamber 118, thereby elevating the pressure of the air in the air transfer chamber 118 as well.

Figure 6:
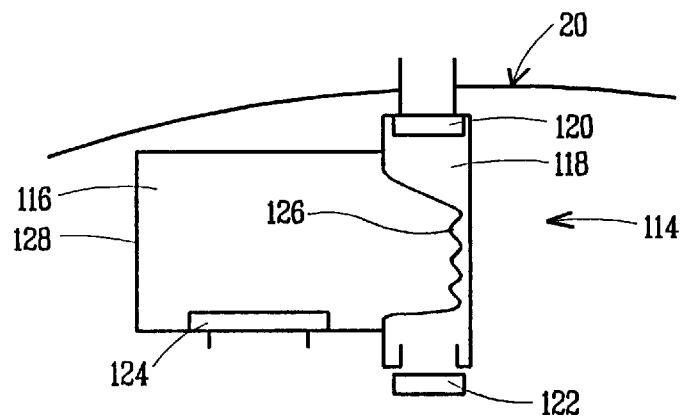

As the overpressure drops, as illustrated in FIG. 6, the pressure in the pumping chamber 116 remains high because the third valve 124 closes to prevent air from flowing back into the interior of the plenum 20. This higher pressure maintains the higher pressure in the air transfer chamber 118 and that higher pressure forces air from the air transfer chamber 118 through the second valve 122 into the plenum 20. Once the plenum 20 returns to a state of constant pressure, the air in the air transfer chamber 118 is exhausted so that no further air flows through the second valve 122, which closes. The higher pressure air in the pumping chamber 116 bleeds back into the inside of the plenum 20 through a small orifice 128 in the pumping chamber. Alternatively, the orifice 128 can be incorporated into the third valve 124.

Figure 7:
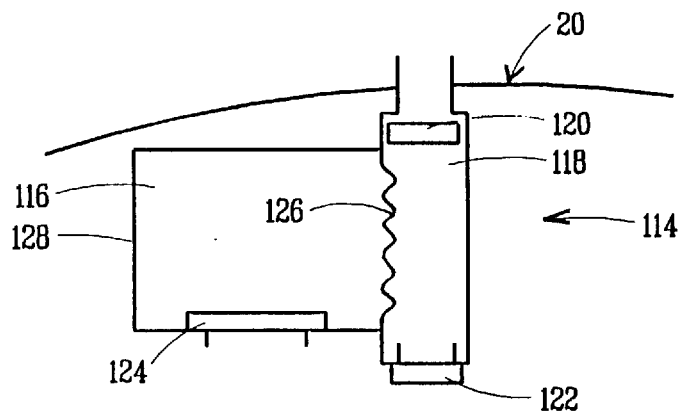

As shown in FIG. 7, air bleeding back into the plenum 20 allows the flexible membrane 126 to spring or rebound back to its static position, thus drawing air into the air transfer chamber 118 from the exterior, thus returning the micromechanical pump 114 to the state depicted in FIG. 4.

With respect to the valves, either passive, biased valves 120, 122, and 124, such as those described with respect to FIG. 3 can be used, as well as the electrically activated valves described with respect to FIG. 2.

Heretofore, the power source 12 for the exemplary micromechanical pumps 42, 88, and 114 has been described in general terms. With respect to an embodiment of a micromechanical pump that controls pressure in a car tire, the energy required from the power source for a typical automotive tire volume, V, of 10 liters can be estimated in the following manner. An estimate of a typical tire pressure loss rate is 1 PSI/week, or 6894 Nt/m/m per week. One week is 7×24×60×60=630,000 seconds. The typical tire is inflated to about 30 PSI. The energy lost in leaking air, dE, (assuming nearly constant volume) is VdP, or (10 liters) (6900 Nt/m/m)=69 joules. This energy is lost during an interval of 630,000 seconds, giving a power loss of 110 microwatts. At a minimum, this is the theoretical average power input to the system 10 required to maintain tire pressure with the specified leak rate. In practice, substantially more power is required due to intrinsic and accidental inefficiencies in the gas transfer mechanism, the control unit 16, and the pressure sensor 14.

Although power sources known to those skilled in the art, such as a battery, can provide the required power, applications for vehicle tires benefit from a renewable power source that has few or no mechanical, pneumatic, hydraulic, thermal, or electrical couplings between the rotating rim and tire and the remainder of the vehicle.

One embodiment of the power source 12 which meets these requirements is a photovoltaic cell illuminated by ambient light. Sunlight supplies approximately 1 KW/m/m. A conversion efficiency of 10% is achievable with simple solar cells. If only 1% of the direct sunlight is available, due to shading, cloud cover, and night, an available potential power density of 1 Watt/m/m is obtainable. Because as much as 1 mW could be required to power the system, a light collection area of approximately 3 cm×3 cm is required. The photovoltaic cell can be positioned on the tire sidewall.

FIGS. 8A and 8B illustrate an embodiment of the power source 12, wherein a piezoelectric material, preferably poled oriented polyvinylidenefluoride (PVDF, tradename Kynar) plastic sheet or film 130, is bonded (such as during ply layup) under a tire tread 132 between an inner layer 134 of a tire tread 132 and an outer layer 136. The PVDF film 130 generates an electric charge as it deforms with the tire tread, the tread deforming at a location 138 where the tread 132 comes into contact with the ground or a road 140.

Figure 9:
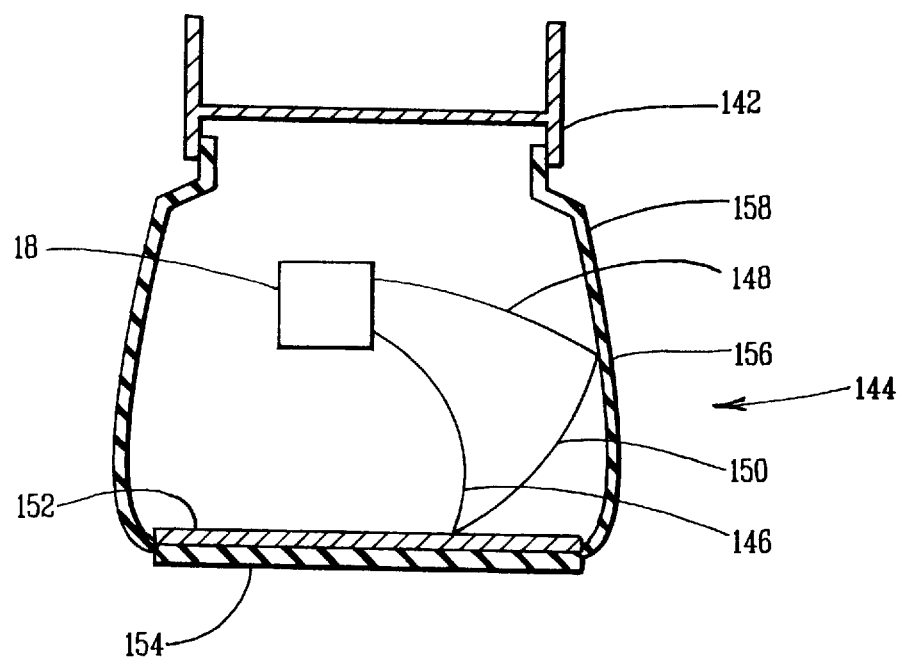
FIG. 9 is a schematic representation of another embodiment of a power source of the gas transfer system of FIG. 1.

Another embodiment of the power source 12 takes advantage of a temperature differential between portions of a tire/rim assembly 142 to power a thermocouple or other temperature-to-energy conversion devices. FIG. 9 illustrates a power source wherein a temperature differential between hot and cold junctions represents a thermocouple 144 across which is generated a potential related to the heat differential between the junctions. First and second wires, 146 and 148, respectively deliver electrical energy to a gas transfer mechanism 18, and a third wire 150 connects a portion of the first wire 146 to a portion of the second wire 148. The first and second wires comprise one material such as copper, whereas the third wire comprises another material, such as constantan. The junction between the first and third wire is a hot junction 152 located at a point in or near the tread 154. The junction between the second and third wire is a cold junction 156 located at a point in or near the tire sidewall 158. Alternatively, the cold junction 156 can be situated in or near a portion of the wheel rim 142.

Figure 8:
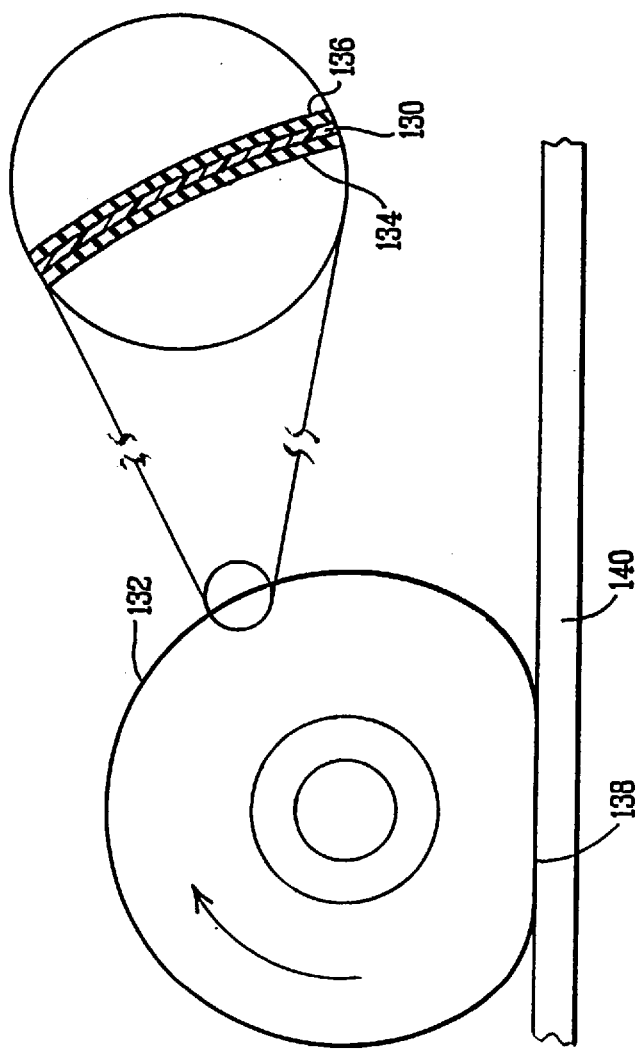
FIGS. 8A and 8B are a schematic representation of an embodiment of a power source of the gas transfer system of FIG. 1.

Thus, when a power source 12, such as that described with respect to FIGS. 8 and 9 is associated with a micromechanical pump of FIGS. 2, 3, 4, and 5, an integrated self inflating tire system 10 is provided. For this implementation, the pressure sensor 14, power source 12, gas transfer mechanism 18, and control unit 16 are integrated on a single silicon substrate, such as is described hereinbelow with respect to FIGS. 10–15. The system can thus operate to either add or subtract air from a tire interior, depending upon the desired direction of air flow. Alternatively, air can be pumped into the tire by the system 10 without regard to the pressure within the tire, wherein a pressure relief valve performs the necessary regulation. The system can be built into the tread or sidewall of a tire during layup or as part of the tire rim assembly.

Alternatively, the pressure sensor 14, gas transfer mechanism 18, and power source 12 can comprise a device sized to take the place occupied by an ordinary valve stem used for filling tires from external air pumps.

Figure 10:
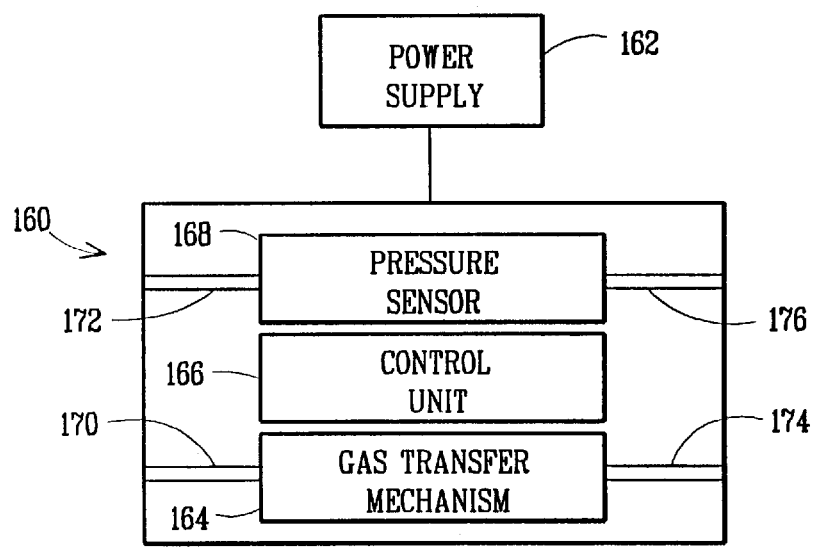
FIG. 10 is a schematic illustration of an integrated assembly embodiment of a gas transfer system of the invention.

FIG. 10 illustrates schematically an embodiment of a gas transfer system 160, having an integral structure, connectable to a power supply 162. The system 160 includes a gas transfer mechanism 164, a control unit 166, and a pressure sensor 168. The system 160 further includes first air passages 170 and 172, and second air passages 174 and 176, associated with the gas transfer mechanism 164 and the pressure sensor 168, respectively.

Figure 11:
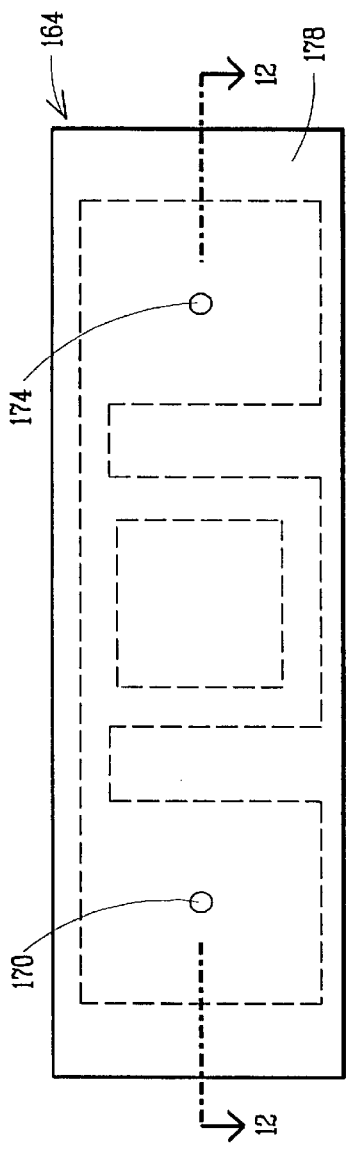
FIG. 11 is plan view of the gas transfer mechanism of the system of FIG. 10.
Figure 12:
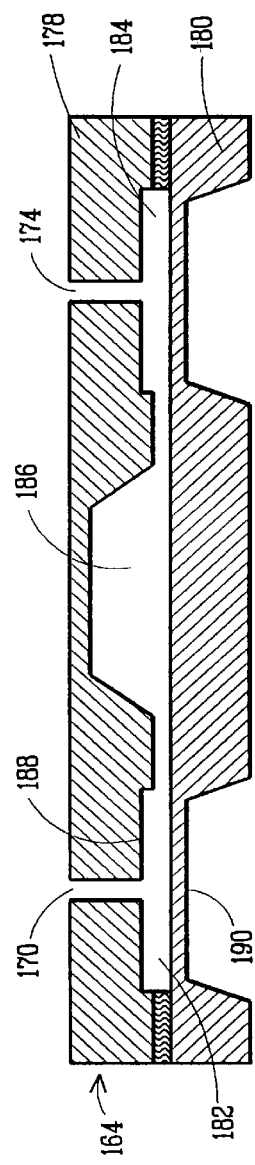
FIG. 12 is a sectional view of the gas transfer mechanism of FIG. 11.
Figure 13:
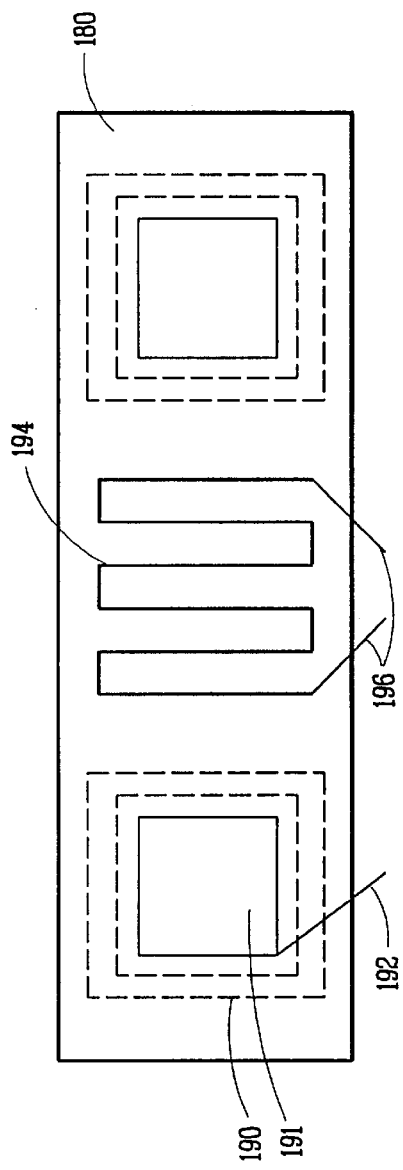
FIG. 13 is a plan view of a lower portion of the gas transfer mechanism of FIG. 11.

FIGS. 11 and 12 are plan and sectional views, respectively, of an exemplary embodiment of the gas transfer mechanism 164, including a first portion 178 and a second portion 180. An interior facing surface of the second portion 180 is shown in plan view in FIG. 13. The first air passage 170 and the second air passage 174 lead to a first valve 182 and a second valve 184, respectively, which control the passage of a gas to and from a heating chamber 186. Each valve 182 and 184 includes a valve seat 188 to which a first charge of a selected polarity can be applied, and a movable sealing element 190, such as a flexible membrane having a metallic plate 191 to which a second charge of a selected polarity can be applied via a wire 192. The second portion 180 further includes a heating element 194 connected to wires 196 through which an electric current can be passed to heat gas in the heating chamber 186.

The gas transfer mechanism functions in the following manner to pump air into a plenum such as a tire, for example. A pumping cycle begins by applying an electric current to the wire 192 of the movable sealing element 190 associated with the first valve 182, imparting a charge to the metallic plate 191, and causing it to be drawn toward the valve seat 188 and held thereto in a sealing relationship, thus preventing gas from moving through the first valve 182. Subsequently, the second valve 184 is closed in like manner.

After the second valve 184 is closed, the first valve 182 is opened by removing the charge on the metallic plate 191. An electric current is passed through the heating element 194, causing gas in the heating chamber 186 to expand, forcing it through the first valve 182 and into the first air passage 170. The first valve 182 is then closed and the second valve 184 reopened to continue the pumping cycle if desired.

Gas can be removed from a plenum, assuming the inside pressure is higher than the outside pressure, by simply placing both valves 182 and 184 in their open state. Alternatively, the gas inside the plenum can be pumped out of the plenum by reversing the opening and closing of the valves 182 and 184 in relation to the heating cycle.

Although the unelectrified state of the valves 182 and 184 is "open," in an alternative embodiment of the gas transfer mechanism 164, the unelectrified state is "closed." This configuration is provided by imbuing the flexible sealing element 190 of each valve with a shape that places them in sealing contact with the valve seat 188, until a repulsive charge is placed on the metallic plate 191.

Figure 14:
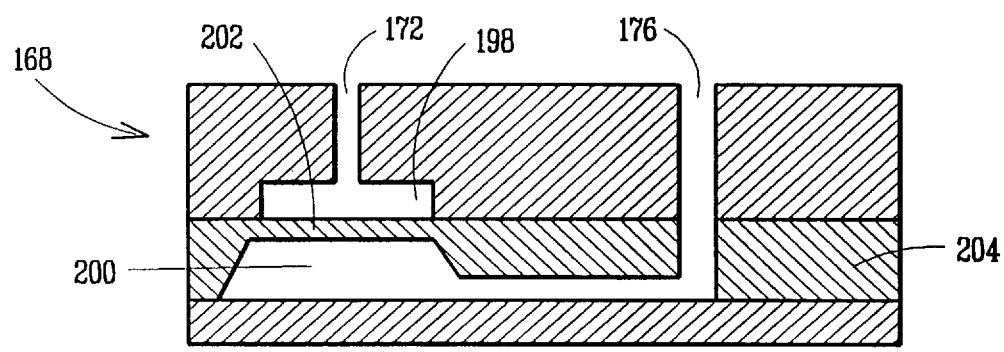
FIG. 14 is a sectional view of the pressure sensor of the gas transfer system of FIG. 10.

FIG. 14 is a sectional view of an exemplary pressure sensor 168 for the gas transfer system 160, wherein the first air passage 172 associated with the pressure sensor leads to a first chamber 198 and the second air passage 176 leads to a second chamber 200, separated from the first chamber by a deformable element 202. The deformable element 202 deforms in proportion to the pressure difference between gas in the first and second chambers 198 and 200, respectively.

Figure 15:
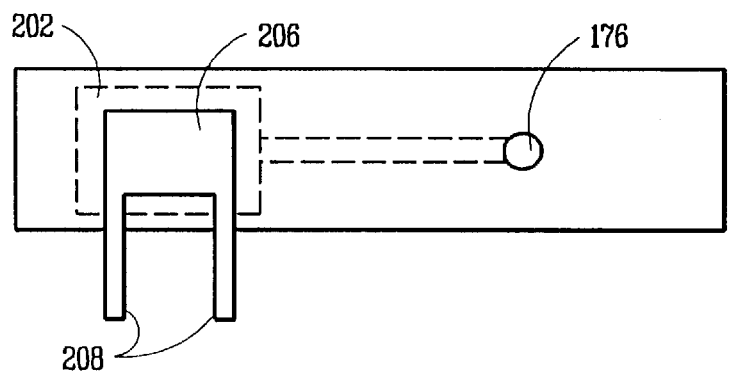
FIG. 15 is a plan view of an internal portion of the pressure sensor of FIG. 14.

FIG. 15 is a plan view of a central layer of material 204 of the pressure sensor 168, having a resistive element 206 positioned on the deformable element 202. The resistive element 206 can include a piezoelectric material or other material having a resistance that varies with deformation. The deformation of the resistive element 206 is measured by passing a current through wires 208 connected to the resistive element 206.

It will be appreciated by persons skilled in the art that the present invention is not limited to what has been particularly shown and described hereinabove. A variety of modifications and variations are possible in light of the above teachings without departing from the scope and spirit of the invention, which is limited only by the following claims.

What is claimed is:

1. A tire pressure maintenance system, comprising:
   a pressure sensor for measuring gas pressure in said tire and providing a pressure signal representative of said gas pressure;
   a control device responsive to said pressure signal and to provide a control signal; and
   a gas transfer mechanism including a micromechanical pump responsive to said control signal for transferring gas into said tire from a location external to said tire, said micromechanical pump including,
   a pumping chamber;
   an air transfer chamber;
   a flexible membrane separating said air pumping chamber from said air transfer chamber;
   a first valve between said air transfer chamber and a location external to said tire;
   a second valve between said air transfer chamber and a location internal to said tire; and
   a third valve between said pumping chamber and a location internal to said tire.

2. The tire maintenance system of claim 1, wherein said pumping chamber includes a means for bleeding pressurized gas from said pumping chamber to an internal region of said tire.

3. The tire maintenance system of claim 1, wherein said first valve, said second valve, and said third valve are each passively biased and responsive to gas pressure;
   said first valve opening in response to an excess of gas pressure external to said tire with respect to the gas pressure within said air transfer chamber;
   said second valve opening in response to an excess of gas pressure within said air transfer chamber with respect to the gas pressure within said tire; and
   said third valve opening in response to an excess of gas pressure within said tire with respect to the gas pressure within said pumping chamber.

4. The tire maintenance system of claim 1, wherein the flexible membrane deforms in response to a pressure change in said tire.

5. The tire maintenance system of claim 1, wherein a pressure increase within said tire causes the pressure within said pumping chamber to be increased, thereby deforming said flexible membrane.

6. The tire maintenance system of claim 5, wherein deformation of said flexible membrane causes a volume of said pumping chamber to increase and a volume of said transfer chamber to decrease.

* * * * *